Patented June 3, 1924.

1,496,678

UNITED STATES PATENT OFFICE.

WALTER A. RUTTER, OF TORONTO, ONTARIO, CANADA, ASSIGNOR TO MERRELL-SOULE COMPANY, OF SYRACUSE, NEW YORK, A CORPORATION OF NEW YORK.

APPARATUS FOR TREATING SEWAGE.

Application filed March 6, 1920. Serial No. 363,730.

*To all whom it may concern:*

Be it known that I, WALTER A. RUTTER, of Toronto, in the Province of Ontario, in the Dominion of Canada, have invented new and useful Improvements in Apparatus for Treating Sewage, of which the following, taken in connection with the accompanying drawings, is a full, clear, and exact description.

This invention relates to certain improvements in apparatus for treating sewage, and is particularly designed for the treatment of milk sewage.

So far as I am aware, hitherto the practice has been to gather or permit the accumulation of relatively large quantities of milk sewage before any treatment of the same, and after a predetermined amount was gathered it was treated as a batch. This method of operation has necessitated the construction of large and unwieldy apparatus, tanks, etc., occupying a large space and requiring expert attention for its satisfactory operation.

The object of this invention is to produce an apparatus for the described purpose which is capable of continuous operation in the treatment of milk sewage in quantities from zero to the full capacity for which the apparatus is designed and constructed. Further, the apparatus of this invention is compact and relatively small and requires no expert attention. On the other hand, it is practically self-operating for intermittent periods up to the containing capacity of the apparatus for the treating fluids and the precipitated collected sludge.

Another object is to effect a better coagulation and greater precipitation of the solids to be separated and to free the liquid and such other portions of the solids as may be permitted to escape with the liquid, such as the milk sugar, from undesirable odors, bacteria, coli, etc.

Other objects and advantages relate to the details of construction, form and arrangement of the apparatus and the parts thereof as will more fully appear from the following description taken in connection with the accompanying drawings in which.

Figure 1:
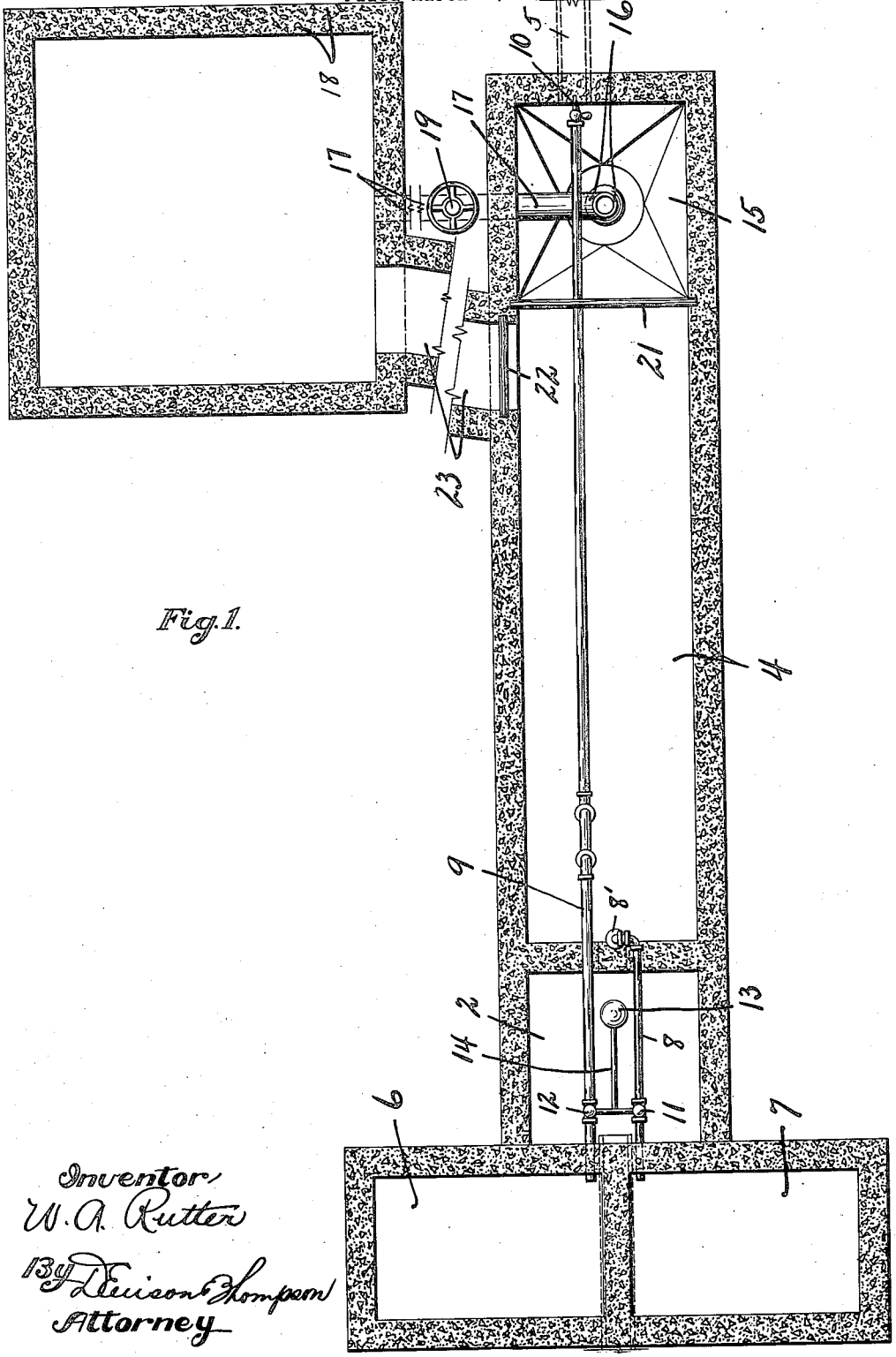
Figure 1 is a top plan view of the apparatus of my invention.
Figure 2:
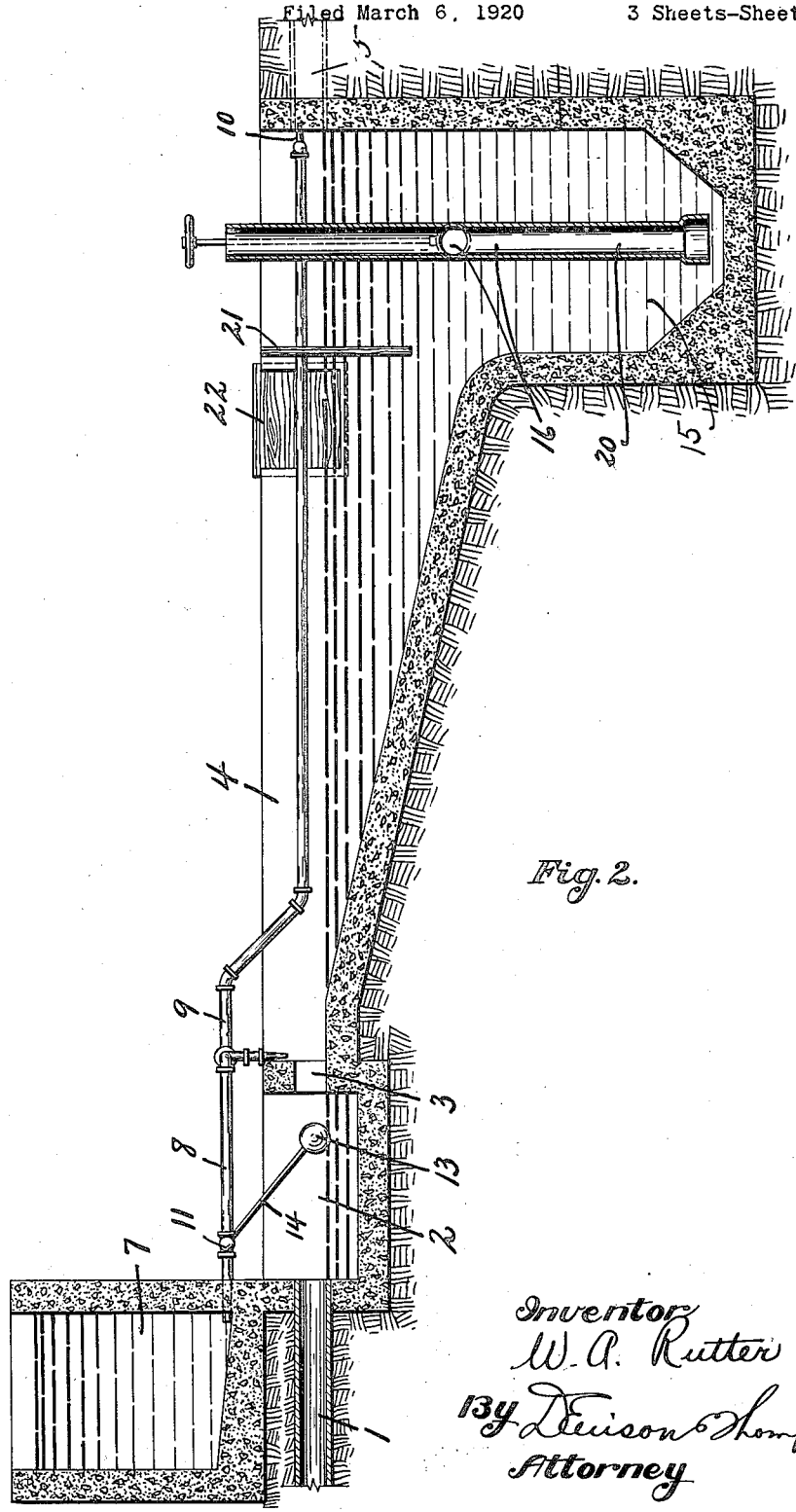
Figure 2 is a longitudinal cross section through the same.
Figure 3:
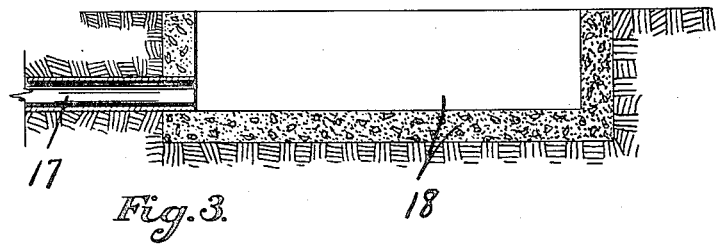
Figure 3 is a cross section through the sludge basin.
Figure 5:
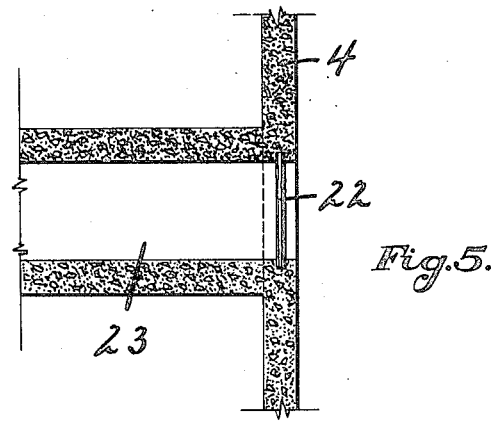
Figure 5 is a top plan view of the portion of the apparatus showing the said slide gate.
Figure 4:
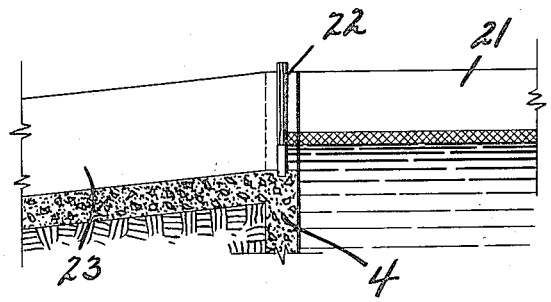
Figure 4 is a lateral cross section through a portion of the apparatus illustrating the slide gate controlling connection between the upper portions of the treating chamber and the sludge basin.

The apparatus as illustrated comprises a drain or pipe —1— through which the raw milk sewage flows into a float chamber —2—, which chamber is provided with an aperture or opening —3— preferably disposed opposite the drain —1—, and leading to the treating chamber —4— and having at its opposite end an outlet or discharge pipe —5— for the liquid and the solids carried thereby after treatment.

A pair of tanks —6— and —7— are provided for containing suitable chemicals or chemical solutions for effecting the treatment hereinafter described. The tank —7— may contain iron. sulphate, or any other suitable coagulating chemical, and this chemical is discharged from the tank —7— through pipe —8— to a drip nozzle —8'— or pet cock disposed adjacent the point of entrance of the milk sewage into chamber —4— through aperture —3—.

The tank —6— may contain chloride of lime or other deodorizer and such chemical is conveyed from the tank by pipe —9— to a point adjacent the outlet —5— at which point the pipe is provided with a drip nozzle or pet cock —10—.

The amount of the chemical flowing from the pipes —8— and —9— and discharging into the sewage is regulated in accordance with the amount of milk sewage entering the float chamber —2— through drain —1—. This control is effected by means of valves in the respective pipes at the points —11— and —12—, such valves preferably simultaneously and similarly actuated by means of a ball float —13— positioned within the float chamber —2— and actuating a T-shaped member —14— for moving both valves in unison.

The milk sewage entering the chamber —4— is therefore treated with the right quantity of coagulated chemical and the precipitation caused thereby is carried on in the treating chamber —4—.

This chamber is specially shaped and formed in order that a slowing up of the velocity of the milk sewage may be obtained and its shape is such that the precipitated solids are forced by the action of the flowing sewage into a cistern or pit —15— at the end of the treating chamber —4—. For this purpose the lower wall of the treating chamber —4— is inclined downwardly toward the end at which the cistern is formed and its inclination is such as to lead to the discharge of the precipitated solids into the cistern —15— in the most efficient manner.

The milk sewage is thus deprived of practically all solids other than the milk sugar, and is passed directly through the chamber —4— to the outlet —5— where the proper amount of treating fluid, as chloride of lime, is fed into the effluent by the drip nozzle —10—.

The continuous operation of the apparatus depends therefore only upon the continuous supply of suitable chemical in the vats —6— and —7— and the capacity of the cistern —15— to contain accumulated sludge.

In practice it is found that a relatively small and compact apparatus of the character described is capable of treating milk sewage continuously without attention for at least twenty-four hours, and by a simple change in the size of the chemical receptacles and perhaps the cistern the apparatus can be made to require attention less often.

The withdrawal of the accumulated sludge from the cistern —15— is effected by means of the T-shaped pipe —16— having its lower end reaching to within a short distance of the bottom of the cistern —15— and its upper end extending vertically above the level of the milk sewage, forming a vent from the cistern preventing any siphoning action from taking place.

The T-arm —17— of this pipe extends horizontally outward through the side of the cistern —15— to a point preferably near the bottom of the sludge basin —18—. A control valve —19— is situated between the tank —15— and the sludge basin —18—, and this valve is normally closed during the time the system is in operation and is opened at such times as may be required for emptying accumulated solids from the cistern —15— into the basin —18—. From experience this time is found to be perhaps four days, with a relatively small apparatus.

The pipe —17— is so situated that when the valve —19— is opened the milk sewage in the apparatus has sufficient head or force upon the accumulated sludge to cause these solids to move upward through the pipe —20— into the pipe —17— by means of which they are discharged into the sludge basin. When all of the accumulated solids have been forced from the cistern, valve —19— is again closed.

The floating solids, particles and froth are held in the treating chamber —4— by means of a baffle —21— extending across the upper portion of the treating chamber and beneath the normal level of the sewage, as determined by the level of the outlet —5— and for the purpose of discharging these floating materials into the sludge basin one of the side walls of the treating chamber —4— is formed with a recess or depression extending below the normal level of the flowing sewage, such recess being normally closed by a vertically sliding gate —22—. By raising the gate the floating particles are permitted to escape into passageway —23— leading to, and are discharged into the sludge basin —18—.

The gate —22— is on the same side of baffle —21— as the inlet —3— for the sewage to be treated.

Preferably the treating chamber, chemical tanks and cistern are installed in an enclosure, as within the condensory or milk treating plant, while the sludge basin is installed in the open air so that the sludge will be air dried and capable of being handled by shovels or similar means.

The operation of the apparatus will be readily understood, and although I have illustrated a preferred construction and arrangement of the parts I do not desire to limit myself to the same, as various changes may be made in the details of construction and operation without departing from the invention as set forth in the appended claims.

What I claim is:

1. A sewage treating apparatus comprising a chemical tank, a float chamber, an inlet for sewage to said float chamber, a treating tank in communication with said float chamber and having the rear end of its bottom wall above the level of the bottom wall of said float chamber, said treating chamber inclining forwardly and downwardly from its communication from the float chamber, and terminating at its forward end in a cistern in free and open communication with the treating chamber having its bottom wall disposed a considerable distance beneath the termination of the bottom wall of said treating tank, a pipe leading from the chemical tank to the treating chamber, and a float in said float chamber controlling the passage of chemicals through said pipe.

2. A sewage treating apparatus comprising a chemical tank, a float chamber, an inlet for sewage to said float chamber, a treating tank in communication with said float chamber and having the rear end of its bottom wall above the level of the bottom wall of said float chamber, said treating chamber inclining forwardly and downwardly from its communication from the float chamber, and terminating at its forward end in a cistern having its bottom wall disposed a considerable distance beneath the termination of the bottom wall of said treating tank, a pipe leading from the chemical tank to the treating chamber, a float in said float chamber controlling the passage of chemicals through said pipe, a second chemical tank, a pipe leading from the second chemical tank to the cistern, and a valve in said pipe controlled by said float.

3. A sewage treating apparatus comprising a treating tank having its bottom wall inclined downwardly and forwardly and terminating at its forward end in a cistern having its bottom wall depressed a considerable distance below the termination of the bottom wall of said treating tank, a sludge basin, a discharge pipe having its lower end near the bottom of said cistern and its opposite end in communication with said sludge basin, a baffle extending across the said treating tank and extending below the normal level of liquid therein during operation, and means adjacent said baffle and at the rear thereof permitting communication between the treating tank and the sludge basin.

In witness whereof I have hereunto set my hand this 19th day of February 1920.

WALTER A. RUTTER.

Witnesses:
 IRVING T. MENETT,
 A. M. RUSSELL.